US011937564B2

(12) United States Patent
Massey (10) Patent No.: US 11,937,564 B2
(45) Date of Patent: Mar. 26, 2024

(54) PLANT GROWING APPARATUS AND METHOD

(71) Applicants: HYDRO GROW LLC, Evansville, IN (US); Scott Massey, Evansville, IN (US)

(72) Inventor: Scott Massey, Evansville, IN (US)

(73) Assignee: HELIPONIX, LLC, Evansville, IN (US)

( * ) Notice: Subject to any disclaimer, the term of this patent is extended or adjusted under 35 U.S.C. 154(b) by 11 days.

(21) Appl. No.: 16/339,104

(22) PCT Filed: Oct. 9, 2017

(86) PCT No.: PCT/US2017/055769
§ 371 (c)(1),
(2) Date: Apr. 3, 2019

(87) PCT Pub. No.: WO2018/068042
PCT Pub. Date: Apr. 12, 2018

(65) Prior Publication Data
US 2020/0037514 A1  Feb. 6, 2020

Related U.S. Application Data

(60) Provisional application No. 62/524,811, filed on Jun. 26, 2017, provisional application No. 62/467,621, (Continued)

(51) Int. Cl.
*A01G 9/26* (2006.01)
*A01G 9/02* (2018.01)
*A01G 9/24* (2006.01)

(52) U.S. Cl.
CPC .............. *A01G 9/26* (2013.01); *A01G 9/023* (2013.01); *A01G 9/246* (2013.01); *A01G 9/247* (2013.01); *A01G 9/249* (2019.05)

(58) Field of Classification Search
CPC ........ A01G 31/06; A01G 9/023; A01G 9/022; A01G 9/025; A01G 31/047; A01G 31/02;
(Continued)

(56) References Cited

U.S. PATENT DOCUMENTS 4,779,378 A   10/1988  Mason
5,031,359 A * 7/1991  Moffett, Jr. ............ A01G 9/022
                                              47/83
(Continued)

FOREIGN PATENT DOCUMENTS

GB    2431328 A    4/2007
JP    260559 U     5/1990
(Continued)

OTHER PUBLICATIONS

European Search Report for EP17859314; 11 pages.
(Continued)

*Primary Examiner* — Jeffrey R Larsen
(74) *Attorney, Agent, or Firm* — Taft Stettinius & Hollister LLP; Derek B. Lavender (57) ABSTRACT

A plant growing apparatus, comprising an enclosure having an interior and exterior, wherein the interior of the enclosure is configured to maintain environmental conditions within the enclosure, one or more light sources, a planting column having an aperture extending therethrough, a rotatable base, a central conduit, wherein said conduit extend through the aperture of the planting column and said planting column is configured to be rotatably movable around said central conduit, a water source, at least one sensor, an irrigation system, and a control system configured to be communicatively coupled to the irrigation system, one or more sensors, light source, and rotatable base.

20 Claims, 9 Drawing Sheets

Related U.S. Application Data filed on Mar. 6, 2017, provisional application No. 62/405,532, filed on Oct. 7, 2016.

(58) Field of Classification Search
CPC . A01G 9/00; A01G 9/104; A01G 9/26; A01G 9/249; A01G 9/246; A01G 9/247; Y02P 60/216; Y02P 60/244
USPC .............. 47/66.7, 65.5, 79, 83, 87, 17, 59 R
See application file for complete search history.

(56) References Cited

U.S. PATENT DOCUMENTS

| | | | |
|---|---|---|---|
| 5,404,672 A | 4/1995 | Sanderson | |
| 5,617,673 A * | 4/1997 | Takashima | A01G 31/047 47/60 |
| 6,182,453 B1 | 2/2001 | Forsberg | |
| 9,730,400 B2 * | 8/2017 | Wilson | A01G 31/045 |
| 2002/0040548 A1 | 4/2002 | Ware | |
| 2008/0148630 A1 | 6/2008 | Ryan et al. | |
| 2010/0042234 A1 | 2/2010 | May et al. | |
| 2012/0279126 A1 * | 11/2012 | Simmons | A01G 31/06 47/62 A |
| 2014/0000162 A1 | 1/2014 | Blank | |
| 2014/0083007 A1 * | 3/2014 | Galvan | A01G 9/023 47/62 A |
| 2014/0259920 A1 * | 9/2014 | Wilson | A01C 1/00 47/62 R |
| 2016/0316646 A1 | 11/2016 | Lepp et al. | |
| 2016/0324089 A1 * | 11/2016 | Miyabe | A01C 21/005 |
| 2017/0049915 A1 | 2/2017 | Brais et al. | |
| 2017/0347547 A1 | 12/2017 | Lu et al. | |
| 2018/0007845 A1 | 1/2018 | Martin | |
| 2018/0042186 A1 * | 2/2018 | Kop | A01H 1/027 |

FOREIGN PATENT DOCUMENTS

| | | |
|---|---|---|
| JP | 2005295955 A | 10/2005 |
| JP | 2006262817 A | 10/2006 |
| JP | 2014-018189 A | 2/2014 |
| KR | 10-1479977 B | 1/2015 |
| WO | 2015111487 A1 | 7/2015 |
| WO | 2016147195 A1 | 9/2016 |
| WO | 2018068042 A1 | 4/2018 |

OTHER PUBLICATIONS

Indian Examination Report for Application No. 201927017850; 6 pages.
Indian Intellectual Property Office (IPO); First Examination Report of corresponding Indian Patent No. 20217010612; dated Aug. 23, 2022; pp. 1-7.
Saudi Authority for Intellectual Property Riyadh, Kingdom of Saudi Arabia; First Substantive Examination Report of corresponding application No. 519401483; Date: May 22, 2022; pp. 8.
African Regional Intellectual Property Organization (ARIPO), Zimbabwe; Examination Report and Search Report; Examiner: John Omiti; dated May 31, 2022; pp. 1-6.
English Translation of Korean Office Action of corresponding application KR10-2019-7012777; dated Mar. 28, 2023; pp. 1-8.

* cited by examiner

PLANT GROWING APPARATUS AND METHOD

CROSS-REFERENCE TO RELATED APPLICATION

This application is a U.S. national stage application under 35 U.S.C. § 371 of PCT International Application Serial No. PCT/US2017/055769, filed Oct. 9, 2017, and which in turns claims priority to U.S. Provisional Application No. 62/405,532, filed Oct. 7, 2016, U.S. Provisional Application No. 62/467,621, filed Mar. 6, 2017, and U.S. Provisional Application No. 62/524,811, filed Jun. 26, 2017, the disclosures of which are hereby expressly incorporated by reference herein in their entireties.

FIELD OF THE INVENTION

This invention relates generally to plant growing systems, such as growing apparatus to be used for plants. In one aspect, this invention relates particularly to an aeroponic apparatus and method for growing plants in a self-contained growing structure.

BACKGROUND

Home gardening and micro gardens in the apartment complexes and neighborhoods has grown in recent years throughout the United States in response to food deserts limiting the availability of fresh produce in densely populated areas. More consumers desire to have fresh produce and herbs grown locally to provide fresher produce, as well as limit the preservatives and chemicals used in large grocery stores. While these gardens do not require large amounts of land, there is still the need to provide physical land to establish the garden to grow produce. Although the global food demand is failing to be met, the human population is continuing to grow, and 3 billion people will be added within the next thirty years. In many urban environments, real estate comes at a premium price that will typically not be dedicated for use as a garden. Additionally, depending upon the climate of the garden and seasonal weather changes, many produce items cannot be grown year around, if at all. Diminishing supplies of potable water and available farm land, both of which are threatened by volatile weather conditions, will become increasingly scarce as housing developments for this growing population are constructed, causing food prices to gradually increase. Currently, many hydroponic systems use horizontal grows which have low yields relative to its footprint. Existent hydroponic systems require extensive assemblies of pumps to circulate the hydroponic nutrient solution as well as a blower to aerate the solution with enough dissolved oxygen to prevent root. These additional actuators cause an increase in power consumption which extends the amount of time for a consumer to experience a return on their investment. Similarly, the system have various shortfalls related to energy consumption, inefficient distribution of water and nutrients, and high maintenance costs.

There exists a need for an apparatus that takes up minimal space within a household to grow fresh produce. The present invention relates to a nutrient film hydroponic and aeroponic apparatus for growing plants, wherein the apparatus can be configured to easily be situated within an apartment or home. The aeroponic apparatus of the present invention can be completely self-contained or integrated into the kitchen along with other appliances and provides a space to consistently grow herbs and other produce. Additionally, the present invention allows for the cultivation of seeds or small seedlings to maturity in a short time period as opposed to a normal growth time line, and without the need for pesticides and herbicides. This growth system enables a user to buy small seed pods to have them shipped directly to their homes to grow produce or herbs in their household.

BRIEF SUMMARY OF THE INVENTION

In one aspect, this disclosure is related to a plant growing apparatus, comprising an enclosure having an interior and exterior, wherein the interior of the enclosure is configured to maintain environmental conditions within the enclosure, one or more light sources, a removable planting column having an aperture extending therethrough, a rotatable base, a central conduit, wherein said conduit extend through the aperture of the planting column and said planting column is configured to be rotatably moveable around said central conduit, a water source, at least one sensor, an irrigation system, and a control system configured to be communicatively coupled to the irrigation system, one or more sensors, light source, and rotatable base.

In another aspect, this disclosure is related to a system of growing, monitoring, and purchasing plants for growing in the plant growing apparatus of the present invention, wherein a plant pod is assigned a barcode, classifying environmental variables for that specific plant species, scanning the barcode and assigning the plant pod within the plant growing apparatus and control system, implementing control algorithm to determine the optimal environmental variables based upon the combination of plant species within the system, and regulating the environment to achieve that environmental preference.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein:

FIG. 4E 4D is an overhead view of an exemplary embodiment of a modular planting column of the plant growing apparatus having an opening sealing member shown in FIG. 4D.

DETAILED DESCRIPTION OF THE INVENTION

The following detailed description is of example embodiments with references to the accompanying drawings. Such description is intended to be illustrative and not limiting with respect to the scope of the possible embodiments. Such embodiments are described in sufficient detail to enable one of ordinary skill in the art to practice them, and it will be understood that other embodiments may be practiced with some variations.

Referring to FIGS. 1-6, the plant growing apparatus 1 comprising an enclosure housing 3 a planting column 5. The enclosure housing 3 can be environmentally controlled to provide an ideal growing environment for the various plant varieties that may be grown in the apparatus. The enclosure can have an interior 7 portion and an exterior portion 9. The enclosure 3 can take multiple shapes in form including cylindrical, triangular, pyramidal, helical, and rectangular in configuration. Each shape can have corresponding sidewalls 11 and a top 13 and bottom 15 to form the enclosure 3. In one exemplary embodiment, the enclosure can be rectangular in nature having six sides, including a top wall 13, a bottom wall 15, and four side walls 11a-d. In an exemplary embodiment, walls 11 can be coupled to a support structure 17 that can act as a skeleton for the enclosure 3. In another embodiment, the walls can be seamlessly joined without a support structures, such as a circular tube or where the walls 11 function as the support structure. Additionally, a wall 11 can include an access door or panel 19 located on one or more of the walls 11 of the enclosure. The access door 19 allows a user to open the enclosure to remove or add plants for growing or harvesting. Similarly, it allows a user access for any plant maintenances that may be necessary.

Figure 1:
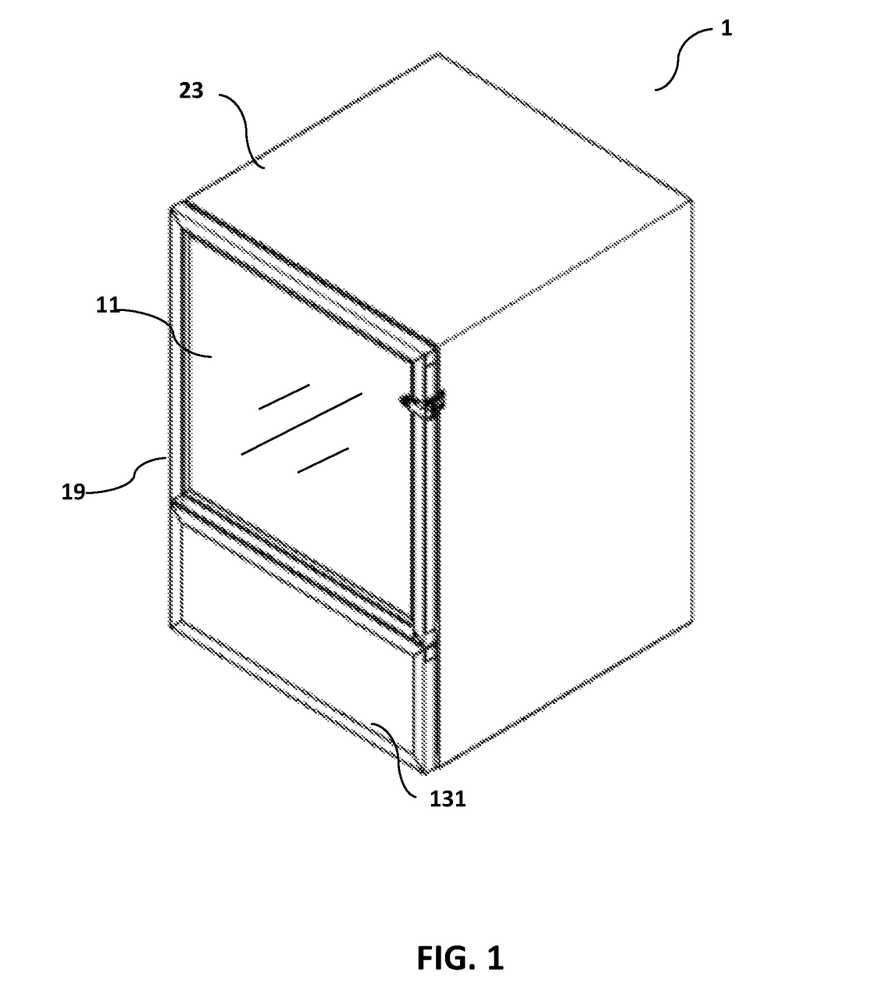
FIG. 1 is a perspective view of and exemplary embodiment of the plant growing apparatus.

The walls of the enclosure can be made from any suitable material. In one exemplary embodiment the side walls can be made from a transparent material, such as glass, Plexiglas, or other polymer. In one exemplary embodiment, the interior side of one or more of the walls can have a reflective coating or material bonded or applied to the interior portion 7 of the enclosure 3 walls. The coating or reflective material, can still maintain transparency from the outside to allow a user or viewer to see inside the enclosure 3 of the plant growing apparatus 1. The reflective interior can act as a mirror and maximize the light efficiency of the light source(s) 21 within the enclosure 3 by reflecting the light throughout the enclosure 3. In one exemplary embodiment, the side transparent walls 11 could be given a colored dye in the forming process to filter out the red-blue grow lights 21 from within the enclosure 3. Additionally, in one exemplary embodiment, the enclosure 3 can further be surrounded by a shell 23. The shell 23 can provided additional structural support and packaging of the enclosure in certain applications. In one exemplary embodiment, the shell 23 can surround one or more sides of the enclosure, such as the top and one or more sides. As illustrated in FIG. 1, the shell 23 can cover the top and three sides 11 of the enclosure having a rectangular configuration. One of the side walls 11 can remain accessible to a user and have a moveable door 19. The door 19 can use any suitable means to be moveable such as a hinge or slidable tracking. In exemplary embodiments having a slidable door 19, the side wall 11 can be have two separate sections. Each section can be moveable, or alternatively, one section can be moveable and the other section can be fixed. Similarly, in another exemplary embodiment, the side wall can have an opening 27 that is covered by the door 19. Additionally, the door 19 and sidewall 11 can further include a gasket or seal 29 to help in maintaining the interior environment 25 of the plant growing apparatus 1. Similarly, the seal 29 can be used to help maintain a positive pressure within the interior environment 25 of the enclosure. In some embodiments, a side wall 11 can be moveable and operate as a door to provide a user access to the interior environment 25 of the plant growing apparatus 1. In various exemplary embodiments of the present invention, the plant growing apparatus can further include a base section 31 to which the enclosure 3 can be coupled or rested upon. The base section 31 can be used as a housing for various components of the system 1, including the water reservoir, pump, conduits, drive motor, and other components.

The enclosure 3 can also further comprise a display 33, for providing user information regarding the environmental aspects within the enclosure, such as temperature, humidity, and light cycle, light spectrum, photosynthetic active radiation, electric-conductivity value of the nutrient solution, pH value of the nutrient solution, environmental PPM of oxygen, $CO_2$, VOC content among others. The display 33 can also be used as a control panel for the apparatus 1. Similarly, the apparatus 1 can include a standalone control panel, which can be communicatively coupled to the apparatus. In one exemplary embodiment, a wireless device, such as a smart phone can operate as a display, control panel, or both. Additionally, a camera 35 would allow users to monitor and view the plant growth inside the apparatus. The camera 35 can be capable and configured to capture hyperspectral imaging to capture data related to the health of the plant within the apparatus 1. Using the plant health data, the control system 39 can process the plant health data to optimize the internal environment 25 within the growing apparatus 1, which may include adjust the temperature, humidity, or the various nutrients that can be added to the water source 57. The display 33 and or control panel 37 can be communicatively coupled to a control system 39, which can include a processing means 41, such as a microcontroller, memory 43, and transceiver 45. Alternatively, the display 33 and control system 39 can be a separate computer or mobile device display communicatively coupled to a control system 39 and powered through an application on the device. This can allow a user to monitor the plant growing apparatus 1 and adjust the desired interior environment 25 within the enclosure 3 remotely using the control system 39 using various wireless standards, such as Wi-Fi, Bluetooth®, ZigBee, NFC, internet, etc. Similarly, the enclosure 3 can use a combination of physical and remote displays to provide interior environment 35 data to a user. The data can be stored on the memory 43 or an eternal server or remote database will be used to collect and analyze the data points from the control system 39 to determine market research and plant growth research.

The planting column 5 can have a top portion 47 and a bottom portion 49. The bottom portion 49 can operate as a turntable proximate to the bottom wall 15 of the enclosure 3 allowing for the planting column 5 to rotate within the enclosure 3. The bottom wall 15 can have an aperture to allow for the drive motor 51 to be coupled to the planting column 5. The planting column 5 can be rotatable, either manually rotated or can use a drive motor 51 to turn the planting column by a user. The drive motor 51 can be positioned proximate to the bottom wall 15 of the enclosure 3. The drive motor 51 can be communicatively coupled to a stepper motor system 111 which can be communicatively coupled to a control system 39. The drive motor 51 could be driven by a belt, chain, direct gear drive, rotated on a chassis with caster wheels, or be magnetically levitated and turned by electro magnets. A program can be stored in the memory 43 of the control system 39 to automatically rotate the planting column 5 as desired at any time setting and for any durations. Similarly, the control system 39 can be communicatively coupled to a control panel 37, wherein the user can manually activate the drive motor 51 to rotate the planting column 5 both clockwise and counterclockwise.

By allowing the planting column 5 to rotate within the enclosure, the plant growing apparatus can be located in many environments and allows a user to easily access plants within the enclosure 3, without the need of reaching round to the opposite side of the enclosure and disrupting the other plants. Similarly, by allowing the planting column 5 to rotate and being able to view the contents from the outside a user can turn the planting column 5 to the desired position before opening the access door 19, thus limiting the time necessary to remove the desired plants. This in turn avoids large fluctuations in the internal environment 25 of the enclosure 3 and prolonged exposure to the environment outside of the enclosure 3. A step motor drive 59 coupled to the rotational drive motor 51 and communicatively coupled to the control system 39 can allow the apparatus 1 to have positional awareness of what plants are facing which specific light sources 21, such as an LED array. This may allow the individual LED arrays 21 to target the specific photosynthetic active radiation and photosynthetic photon flux densities ratios for the plant that is facing it to maximize its photosynthetic efficiency, and reduce power consumption.

In one exemplary embodiment, the planting column 5 can have an interior cavity 55 for receiving an aqueous solution, such as water from the water source. The planting column 5 can further comprise one or more planting openings 59 are included in the column 5 for receiving plants, wherein at least a portion of the plant can extend into the interior cavity 55 for engaging a planting medium, aqueous solution, or both.

Figure 2:
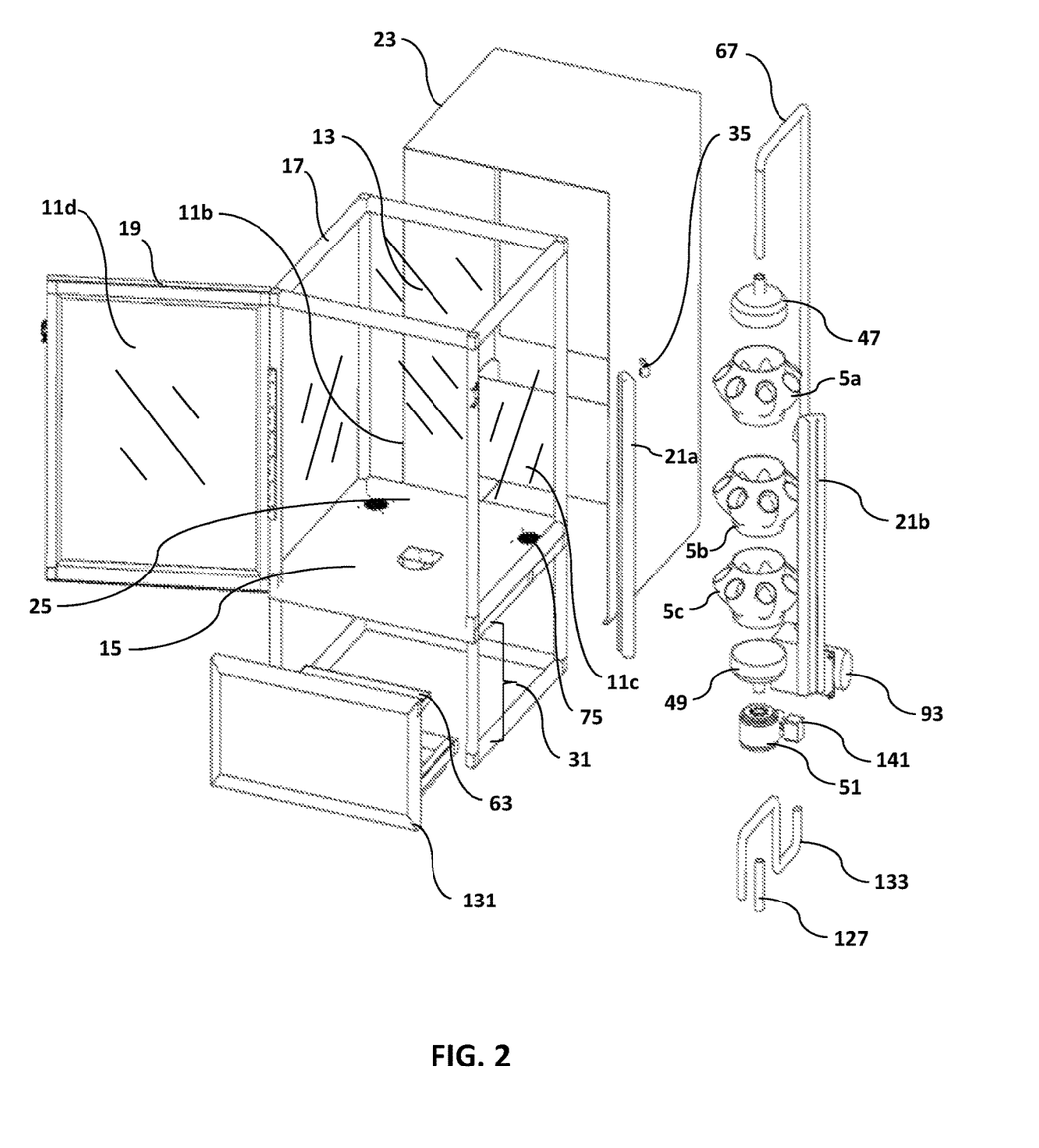
FIG. 2 is an exploded perspective view of an exemplary embodiment of the plant growing apparatus.

The planting column 5 can be modular in nature and comprise one or more sections, as shown in FIG. 2. Each section of the planting column 5 can have a pre-determined number and size of planting openings 59. A user select from various planting column 3 portions depending on the types of plants and/or herbs they desire to grow. If the plant species that a user desires to grow is larger a planting column portion having larger and fewer openings 59 can be used. Additionally, if the plant species desired by the user is smaller in nature, a planting column 5 portion having a greater number of openings 59 can be used within the enclosure. One or more planting column 5 portions can be used in the enclosure 3 depending upon the desired application of the user.

The planting openings 59 can be adapted for an aggregate or soil medium, or alternatively, adapted for use as an aeroponic planting port/apertures to be used without the use of a soil, aggregate, or growing medium. The planting openings 59 can allow for easy placement of plants within individual openings or a plurality of plants within each opening depending on the type of plant and the space needed to optimally grow the plant. The openings extend into the interior cavity 55 of the planting column 5, wherein a portion of a plant, such as the roots extend into the interior cavity of the planting column. The portion extending into the interior of the planting column can be exposed to nutrient rich medium, such as nutrient rich water to provide adequate nutrients to the plant.

In one exemplary embodiment, plants can come prepackaged in a support medium, such as seed starter medium or growing pod 61, and allow a user to easily transport and transplant seedlings or seeds into the plant openings 59 of the plant growing apparatus. Alternatively the plant openings 59 can be configured to accept seedlings without the use of a support medium. The pod can be configured specifically for aeroponic seed growth and allow for a plant root system to propagate and get access to nutrients provided within the internal cavity of the planting column. In one exemplary embodiment, the opening 59 can have a fastening means 69 to enable that the growing pods 61 can be securely coupled to the openings 59. The fastening means 69 can use any suitable means such as a threaded fastener, magnetic fastener, a snap-fit fastener, or other suitable fastening means. Similarly, the pods can have a corresponding fastening means 71 that interacts with the opening fastening means 69. The corresponding fastening means ensures that the growing pod is securely maintained in the opening 59 of the planting column 5, as well as, maintain a sealing relationship to limit or prevent the aqueous solution from escaping from the interior cavity 55 through the opening 59. Alternatively or in addition to, the proximate to the openings 59 of the column can be a hinged opening sealing member 139 can be used to prevent moisture from escaping the interior cavity 55 of the column 5. The flap can be configured to form a seal around the edge of the pod 61 and the opening 59, so as to approximate the shape of the opening 59. In some embodiments, the flap can be hinged, but may be cooped to the opening using any suitable means, such as threaded rod, nut and bolt, or any other variation. Additionally, the bottom portion of the opening sealing member 139 could be lined with a gasket to decrease the permeability of the seal. The opening sealing member 139 be spring loaded to close with additional force, or be fitted with a handle or latch to lock in place and provide increased grip to a user.

The plant growing apparatus can further comprise an irrigation system 95 configured to provide water and other nutrients to plants maintained in the apparatus. The irrigation system 95 can also be used partially as a humidifier to maintain a relative humidity within the plant growing apparatus. The irrigation system can include one or more conduits to transport water and other nutrients throughout the disclosure.

The irrigation system can use a water source to provide water to the plants within the plant growing apparatus. The water source can be directly connected to the plant growing apparatus through a local water plumbed proximate to the area where the plant growing apparatus will be positioned. Alternatively, the water source can be a water reservoir located in the base of the plant growing apparatus. In one exemplary embodiment, the water reservoir can be removable from plant growing apparatus, and prevent the necessity of having a direct water line coupled directly to the plant growing apparatus. This allows the plant growing apparatus to be easily adaptable into consumer's current kitchen or home configurations, without the need to plumb in a new water outlet. The base 31 of the planting column and/or floor within the enclosure can have a draining system to catch overflow and excess water to be recirculated and used by the irrigation system. A water level sensor 135 can actuate a valve relay that is communicatively coupled to the control system 39 to initiate a valve to refill the reservoir to maintain a pre-determined level of liquid within the reservoir.

The water reservoir can use a sensor or device to monitor the water level within the water reservoir. The sensor can communicate with a control panel to provide an alert to a user that the water reservoir needs to be refilled or that the water level is low. Additionally, the plant growing apparatus can further comprise additional reservoirs to store other materials and liquids such as plant nutrients. Any number of reservoirs can be used depending on the desired number of nutrients to be used by a user for plant growth. An additional mixing reservoir can be present that allows for water from the water reservoir to mix with the desired mixture of nutrients prior to being dispensed within the plant growing apparatus.

The irrigation system 95 can further include a one or more pumps 93 configured to transport the water or nutrient rich fluid throughout the conduits 65 to be dispensed to the plants within the apparatus. The pump 93 can be communicatively coupled to the controlled panel 35, so as to be activated remotely when desired by the user. In one exemplary embodiment, the pump 93 can be used to pump materials from the reservoir(s) 63 into a secondary reservoir prior to pumping the aqueous solution for dispensing through the conduit 65 to the dispensing apparatus 67. A secondary reservoir can have one or more chambers that can contain various nutrients that can be added to the water from the reservoir 63 and pumped through the conduit 65 to be provided to the plants.

Figure 3:
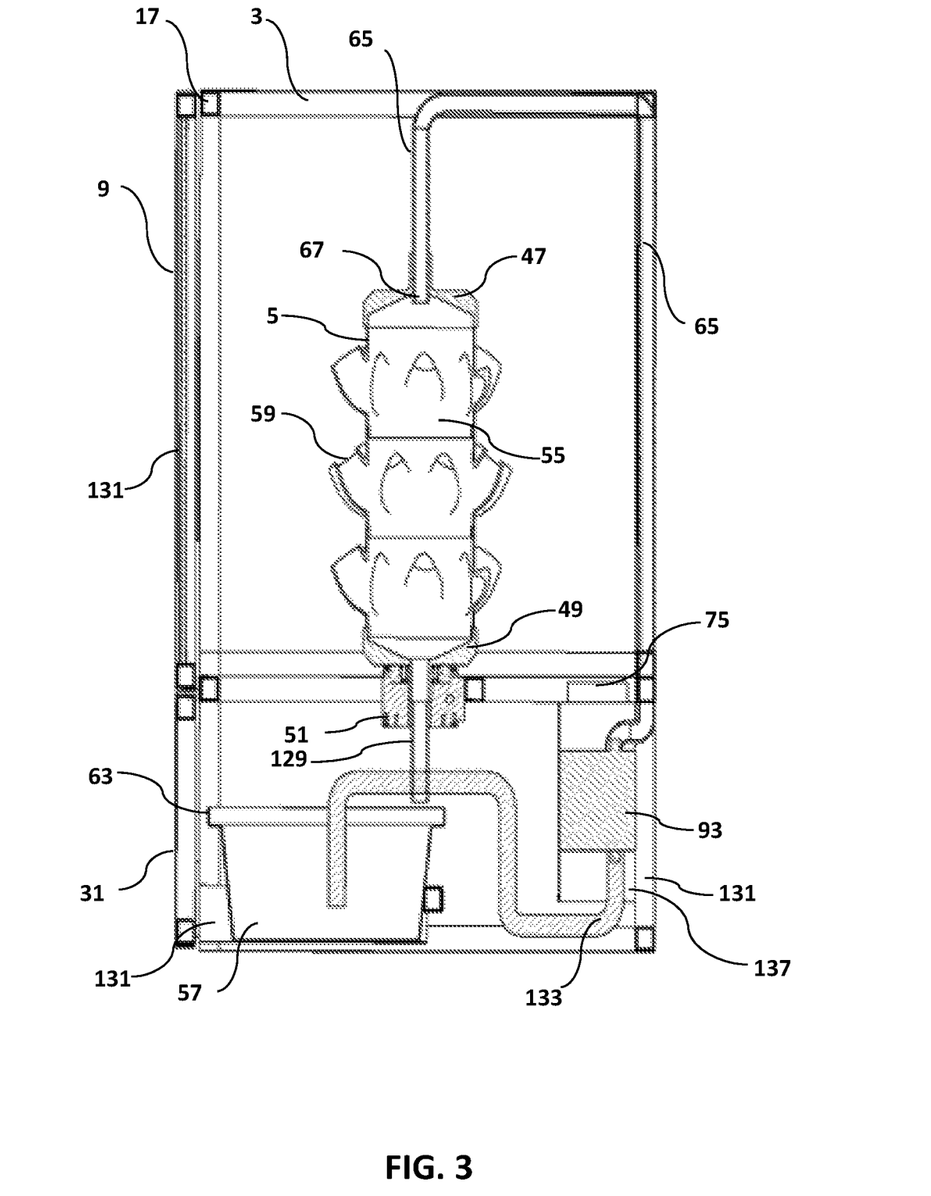
FIG. 3 is a sectional view of an exemplary embodiment of the plant growing apparatus.

In one exemplary embodiment shown in FIG. 3, a reservoir 63 can be located within a drawer 131 that is contained in the base 31 of apparatus 1. When the drawer 131 is open, the user is able to remove the hydroponic nutrient container to clean, empty, or replace the container. A pump 93, which can submerged or in line, with a water source 57, and connects to an inlet conduit 133 which pumps the hydroponic nutrient fluid through the dispensing device 67. In one exemplary embodiment, the water source 57 can come from water stored in a reservoir 63. Alternatively, the pump 93 can be outside of the nutrient solution and plumbed directly inline to dispense hydroponic nutrient solution through the dispensing device. The inlet hose can run inside of a large outlet hose which allows gravity to circulate the hydroponic nutrient solution back to the reservoir 63. Similarly, the inlet conduit 133 can provide a channel to transport the fluid from the reservoir or fluid source to a dispensing apparatus 67 that can have a nozzle or misting head that can be suspended proximate to the top portion 47 of the interior 55 cavity of the planting column 5. The nozzle can provide the aqueous solution to roots extending into the interior cavity 55 of the planting column 5. In one exemplary embodiment, the nozzle can be a misting nozzle. A turntable ring can mount the planting column 5 to the top and bottom of the growing chamber. Alternatively, the planting column 5 can be only mounted to the bottom 15 of the apparatus 1. A turntable ring can include a flange socket placed inside of a bearing, or a slewing bearing driven by a motor or any other torque generating actuator 141.

The inlet hose 133 and outlet hose 129 run inside of the turntable to prevent disrupting the growth medium and irrigation system 95, which might damage the system or the plants. The dispensing means 67 can be removed from a threaded hole on the flange blind to allow the user to clean the device to prevent complete disassembly of the apparatus. In another exemplary embodiment, the dispensing means 67 can have a threaded receiver inside the planting column 5. A gasket 127 can be used between the top of the apparatus and top portion of the column 5 to form a watertight seal. Additionally, the plant growing apparatus 1 may be directly connected to a water source 57, a valve system 97 having using one or more actuatable valves can be used to automatically add water to keep the reservoir 63 at a specified level. In one exemplary embodiment, the planting column 5 can be removable by an accessible bearing that opens, and allows a user to remove a shaft, a spring loaded bearing, or it simply sits on top of a bearing, and can be lifted out of the system.

The dispensing apparatus can be supplied water by a conduit 65 configured to transport water from a water source 57 to the interior cavity 55 of the planting column 5 and to a water dispensing apparatus 67. In one exemplary embodiment, the conduit 65 can be centrally located within the interior cavity 55 of the planting column and terminate at the top portion 47 of the planting column. Alternatively, the conduit 65 can extend along the interior or exterior of one of the enclosure walls and proximate the interior top wall and extend down to the top portion 47 of the column 5 as shown in FIG. 3. The planting column 5 can be configured in a way to be rotatable around a conduit 65 within the interior cavity 55 of the planting column 5. The conduit 65 is fluidly connected to the irrigation system 95, which can include the reservoir 63, pump 93, to transport water from the water source 57 to the dispensing apparatus 67 within the interior cavity 55 of the planting column 5. In one exemplary embodiment, the conduit 65 can have one or more dispensing means located axially from the top to bottom of the column to dispense fluid to the interior cavity of the planting column. In this embodiment the pump and central conduit can maintain enough water pressure to ensure that the fluid is dispensed along the entire height of the central conduit. Aeroponic systems often experience failure through the accumulation of loose biomass from plant roots blocking the misting heads within the recirculation system. This is solved by a removable central conduit that allows the user to clean the orifices without disassembling the apparatus.

The interior of the enclosure can further comprise one or more light sources. In one exemplary embodiment, the light source can be a plurality of light emitting diodes (LEDs). The LEDs can be positioned along the interior of the enclosure. In one exemplary embodiments, the LEDs can extend along the vertical support structures in the corners of the enclosure as shown in FIG. 2. Similarly, the light sources 21, such as LEDs can surround the entire interior of the enclosure to provide suitable light for the plants within the enclosure. As previously stated, the interior of the walls can be reflective to more efficiently distribute the light throughout the interior of the enclosure. An interior corner panel can be used to allow the plant growing apparatus to have LED light arrays 21 that could be mechanically fastened to the vertical support structures 17 or interior corner panels as opposed to the current adhesive backing. This would ensure the longevity, durability, and increase production rates. Additionally, light sources can be coupled to a heat sink. In one exemplary embodiment, the interior corner panels of the enclosure 3 can be removable to allow for ease of assembly, maintenance, or replacement of light sources 21, as well as act as a heat sink. Additionally, the cavity formed by the corners can conceals the wires, and other unsightly electrical components to prevent them from exposure to moisture and other environmental conditions. In another example, the light source 21 could be a series of projectors emitting targeted light intensities to the exact shape and dimension of a plant's profile to specifically target a particular plant within an opening 59. A camera vision database stored on a memory 43 could be would be used to analyze the plants profile from data obtained by the camera 35.

The plant growing apparatus can also comprise additional environmental systems such as a temperature and humidity (TH) system to maintain the temperature and humidity within certain thresholds through the use of fans, blowers, chillers, humidifiers, dehumidifiers, refrigeration, or any air propulsion device. The system 73 can also use a gas injection system to emit $CO_2$ or other gases and maintain ideal $CO_2$ or other gas levels within the enclosure. The system 73 can be coupled to one or more temperature, humidity, $CO_2$, or other environmental sensors 77. Similarly, other environmental systems can include an elect conductivity (EC) system 81 having an EC sensor 83, a pH system 85 having a pH sensor 87, and a photosynthetic active radiation (PAR) system 107 with a PAR sensor 109, among others.

Figure 6:
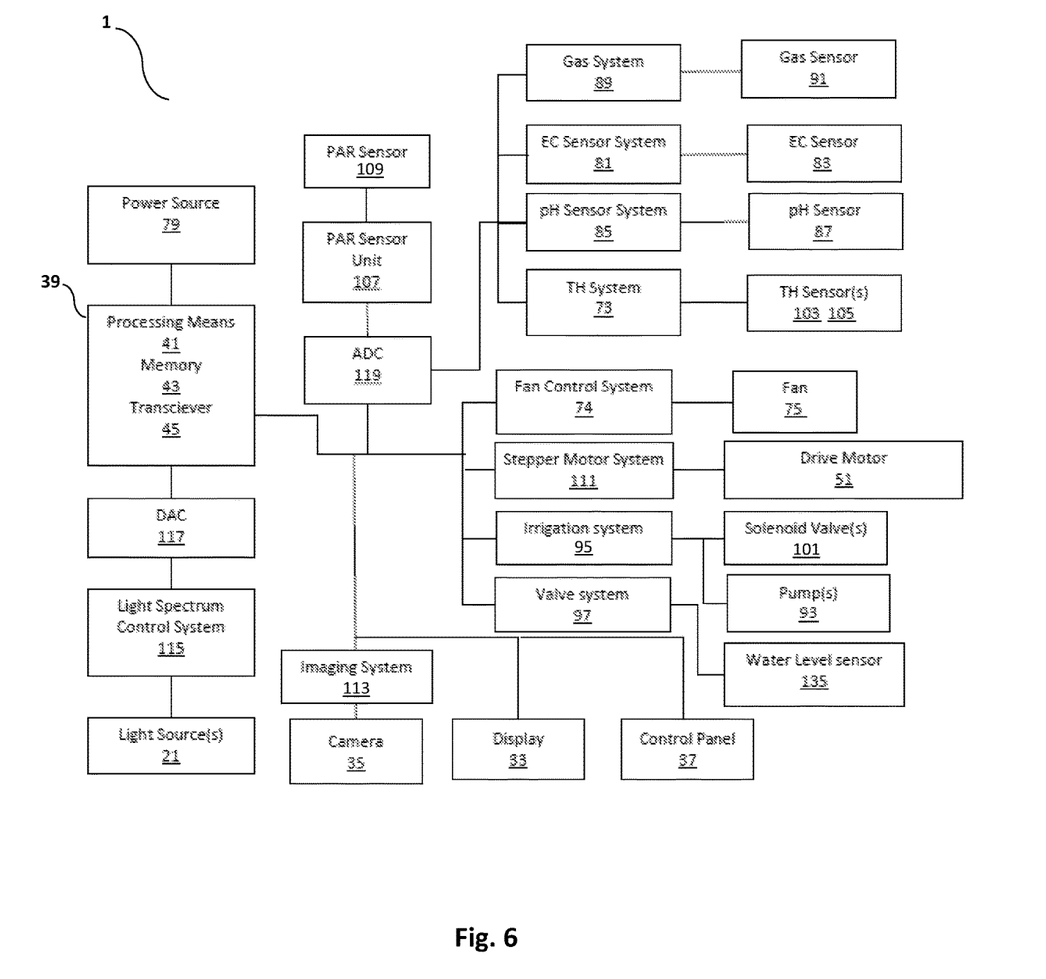
FIG. 6 is a block diagram of an exemplary embodiment of the plant growing apparatus of the present invention.

As shown in FIG. 6, the plant growing apparatus 1 can use a power source 79 to power the various elements of the system. The power source 79 can be directly wired into a grid, solar system, use a battery system or other power method. In one exemplary embodiment, the plant growing apparatus can have a secondary power source, such as a battery backup in case the primary power source is disabled. The plant growing apparatus can further comprise a control system 39 that comprises a processing means 41, a memory 43, a transceiver 45, and an antenna. The control system 39 can be communicatively coupled by various elements of the plant growing apparatus, such as one or more pumps 93, fans 77, TH systems 73, irrigation systems 95, sensors 77, light sources 21, valves systems 97, relays 99, solenoids 101, and drive motors 51 configured to efficiently grow plants. A user can set pre-determined programs on the memory 43 communicatively coupled to the control system 39, wherein the control system 39 can execute the desired program at a pre-determined time or times throughout the day, week, or month by communicated to the various environmental system and components of the apparatus 1.

Similarly, the control system 39 can use environmental data acquired real-time through one or more sensors within the enclosure 3. These sensors can include temperature 103, relative humidity 105, pH 87, electro conductivity 83, PAR 107, photon flux density, infrared camera 35, spectral imaging, among other sensors. These sensors can store and aggregate to monitor and control the interior environment 25 within the enclosure 3 in real-time. Additionally, certain pre-determined parameters can be saved on a memory 43 communicatively coupled to the control system 39 to actuate various components of the plant growing apparatus 1 to respond to the pre-determined parameters. One example includes actuating a valve 101 and pump 93 of the irrigation system 95 to dispense water through the conduit 65 and into the interior cavity 55 of the column 5 within the enclosure to the exposed plant roots. Similarly, a conduit 65 can use a dispensing means to provide moisture to the interior environment and the foliage exposed on the exterior of the planting column 5. In one exemplary embodiment, a conduit can run up vertically through the interior cavity 55 of the column up to a dispensing means 67 proximate to the top portion 47 of the column 5. The bottom portion 49 of the column can include a drainage passage 125 to allow for the aqueous solution drain into a reservoir 63. The drainage passage 125 can be coupled to a drainage conduit 127 to direct the aqueous solution into the reservoir 63.

Additionally, in one exemplary embodiment, one or more cameras 35 can be located within the enclosure 3 to capture video/image data of individual plant openings 59. The image data can be analyzed the control system to determine when a new plant is needed to refill the position or if the plant appears to be dying/withering. The control system 39 can then initiate an alert to the user's display 33 or mobile device. The control system 39 can additionally be communicatively coupled to a drive motor system communicatively coupled to a drive motor 51, LED array spectrum control, imaging system 112, and various fans 75 for the enclosure. In some embodiments fans 75 can be located on proximate to the various walls 11 of the enclosure 3, including the top wall 13 and the bottom wall 15. The fans 75 can be communicatively coupled to a fan control system 53. In some embodiment, the fans 75 can be sealed to allow for positive pressure interior environment 25. Additionally, the fans may have a bug deterrent system to prevent pests from entering the interior environment 25. The control system 39 can be communicatively coupled to both a digital-to-analog converter (DAC) unit 117 and an analog-to-digital converter (ADC) unit 119. To process the various signals from varying systems of the plant growing apparatus 1.

A hyperspectral imaging camera 35 could allow each unit to collect information for large scale phenotyping experiments. The camera 35 could be used to create a feedback loop of detecting moisture deficiencies within the plants, and watering with the pump 93 accordingly to reduce power consumption. The camera 35 can further be used to monitor nutritional content of the plants growing, and correct the content of the nutrient fluid dispensed by the control system 39 by using a similar feedback loop and algorithm stored on the memory 43. While the feedback loop monitoring for both moisture, $CO_2$, and other nutrient deficiencies may be more reactionary, it could remove the need for a system to have a pH 87 and EC 83 sensors that can routinely fail and need to be either replace or recalibrated on a regular basis. The camera 35 can further be used to in place of the RFID tag or barcode system to monitor the actual contents of the growing chamber and provide a user with location and health data of each individual plant. An algorithm/feedback system could be established to order or alert a user using an interface, such as a display 33, to purchase new seedlings upon a plant death, plant harvest, or anticipated plant harvest.

The control system 39 of the plant growing apparatus 1 can use control algorithms to monitor and regulate the exchange of vapors within the system, humidity, lighting cycle, pH of the nutrient solution, electro-conductivity of the nutrient solution using the various environmental systems. Each growing pod 61 can be assigned a barcode, classifying these variables for that specific plant species. When a growing pod 61 is scanned, and placed into the system, the control algorithm can determine the optimal, average environmental variables based upon the combination of plant species within the system, and regulate the environment to achieve that preference. Similarly, the control system 39 can obtain and store data obtained by various systems of the apparatus 1, including but not limited to the gas system 89, EC system 81, pH sensor system 85, imaging system 113, PAR sensor unit 107, and the TH system 73. Based on the data obtained by these systems, the control system 39 can determine the plant health for the individual plants within the apparatus 1, as well as, determine the mean plant health of all plants within the enclosure 3. Using one or more algorithms, the control system 39 can implement commands to various other systems to modify the internal environment 25 within the enclosure 3 to provide a better growing environment from the plants. These systems can include the fan control system 74, stepper motor system 11, irrigation system 95, valve system 97, and light spectrum control system 114 to effectuate the changes to the interior environment 25 within the enclosure 3.

Figure 4A:
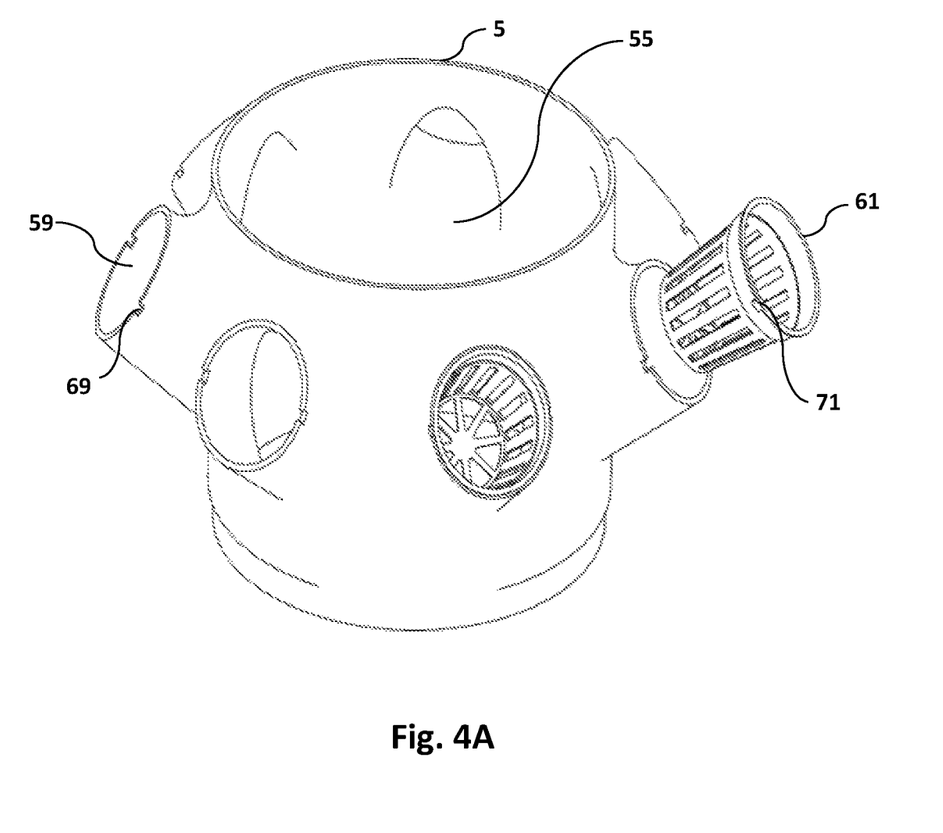
FIG. 4A is a perspective view of an exemplary embodiment of a modular planting column of the plant growing apparatus.
Figures 4B, 4C:
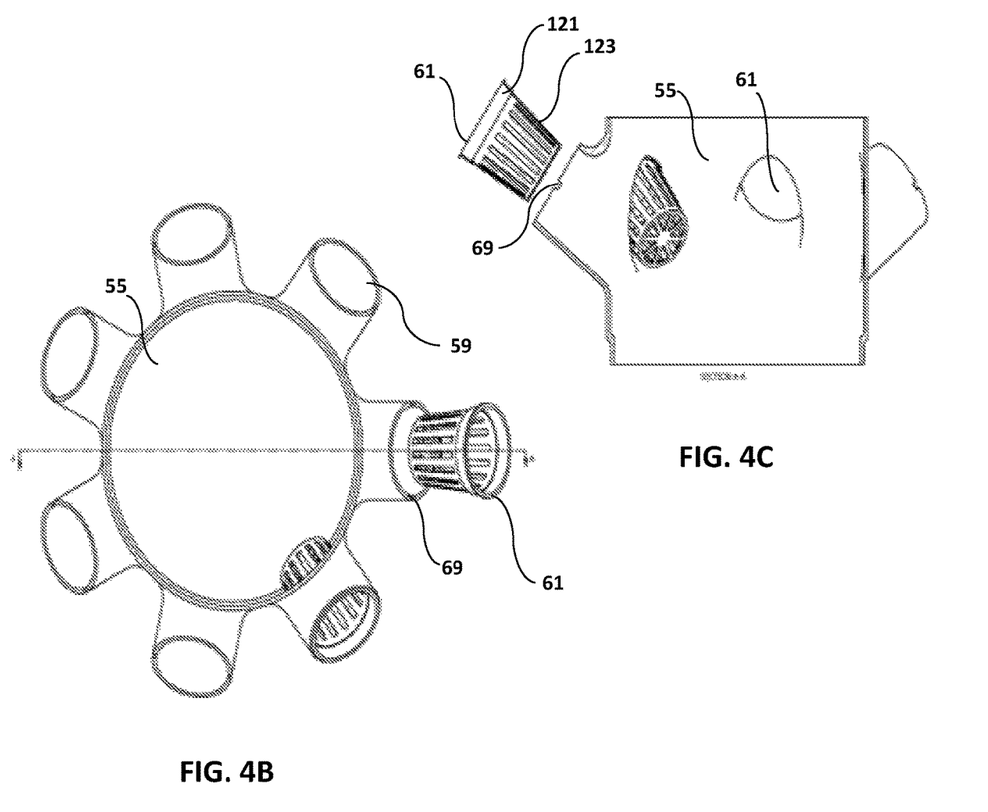
FIG. 4B is an overhead view of an exemplary embodiment of a modular planting column of the plant growing apparatus shown in FIG. 4B.
FIG. 4C is a sectional view of an exemplary embodiment of a modular planting column of the plant growing apparatus shown in FIG. 4B.
Figure 4D:
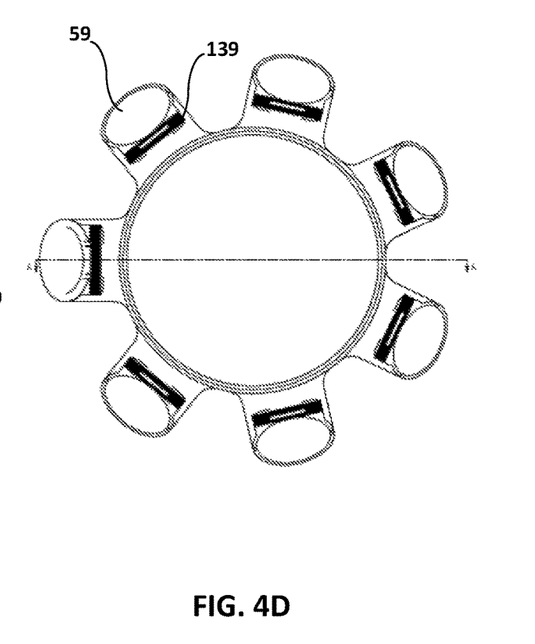
FIG. 4D is an overhead view of an exemplary embodiment of a modular planting column of the plant growing apparatus having an opening sealing member.
Figure 4E:
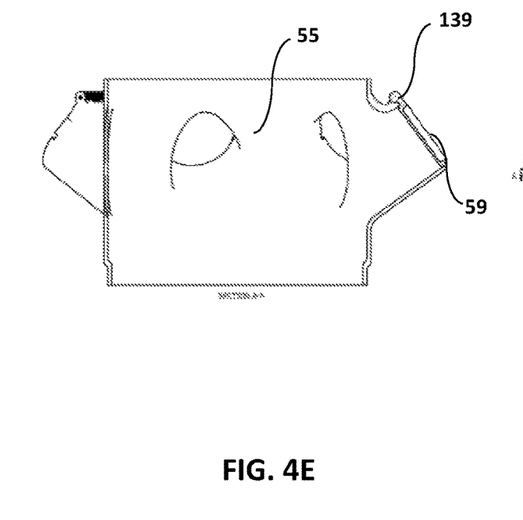

Similarly, the growing pods 61 can use various types of tags to track the types and locations of various plants within the chamber. In one exemplary embodiment, the seed pods can have radio-frequency identification (RFID) tags to track the type and location of plant within the enclosure 3. The correspondence openings/ports 59 to accept the individual pods 61 can have readers to read the tags of the pods. These can include barcode readers, and RFID readers, among others. The growing pods 61 can be any suitable dimension or shape. In one exemplary embodiment shown in FIGS. 4A-4C, the pod 61 can have a top rim 121 having a coupling fastening means 71. The pod 61 can also have a bottom portion 123 that can be perforated to allow for root growth to extend through the bottom portion 123 of the pod 61. In one exemplary embodiment, at least a portion of the pod 61 can extend into the interior cavity 55 of the planting column 5 as shown in FIG. 4C.

In another exemplary embodiment of a pod 61 to be used having a square cone design, and similarly, the planting column can have a corresponding opening 59 shape to receive the pod 61. The receiver ports on the planting column can allow the conical square based, reusable seedling pods to plant seedlings directly into the system. The non-circular design ensures firm placement of the seedling pod, and prevents a potential fall from the planting column 59. The square cone design can help to maintain the pod 61 firmly in place within the aperture of the planting column and aids in limiting the pod 61 from rotating or falling out of the opening 59.

In one exemplary embodiment, the bottom of the square cone 61 can have a substantially planar bottom with an aperture. This aperture can be configured in size to be large enough to allow and promote root growth, but small enough to prevent a seedling from falling through into the interior of the planting column. The pods can be used with or without growing media. Additionally, as shown in FIG. 4B, one exemplary embodiment of the plant pod, can have a circular top portion. The top portion can further comprise an engaging mechanism to be used to securely engage the pod with the planting column. In one embodiment, the engaging mechanism can be a magnet to couple the pod with a corresponding magnet on the planting column. One or more magnets can be utilized. In one exemplary embodiment, the one or more magnets can be located on the underside of the top portion of the pod.

Figure 5A:
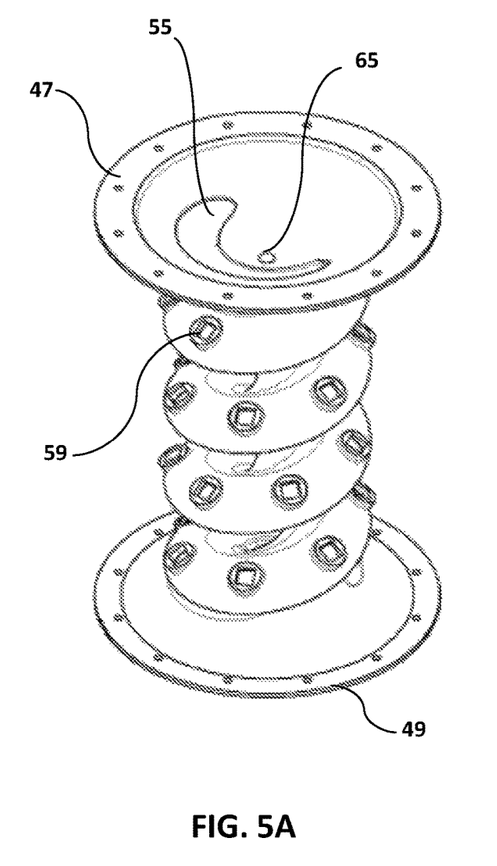
FIG. 5A is a perspective view of an exemplary embodiment of a planting column of the present invention having a helical configuration.
Figure 5B:
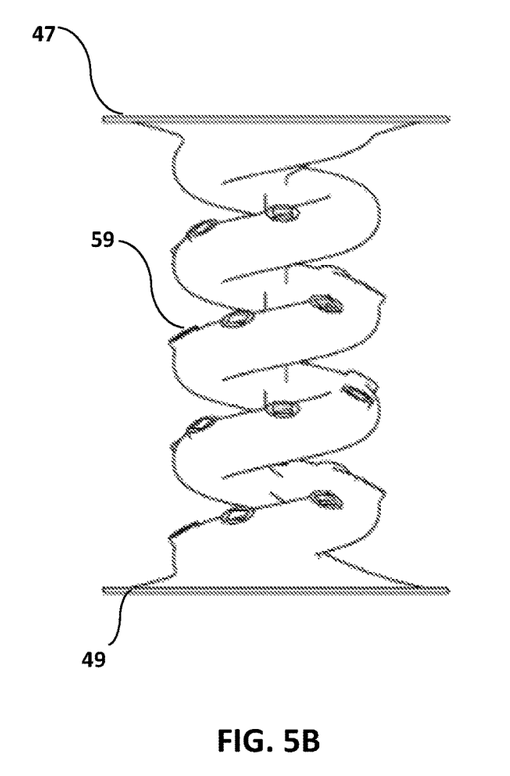
FIG. 5B is a side perspective view of an exemplary embodiment of a planting column of the present invention having a helical configuration.
Figures 5C, 5D:
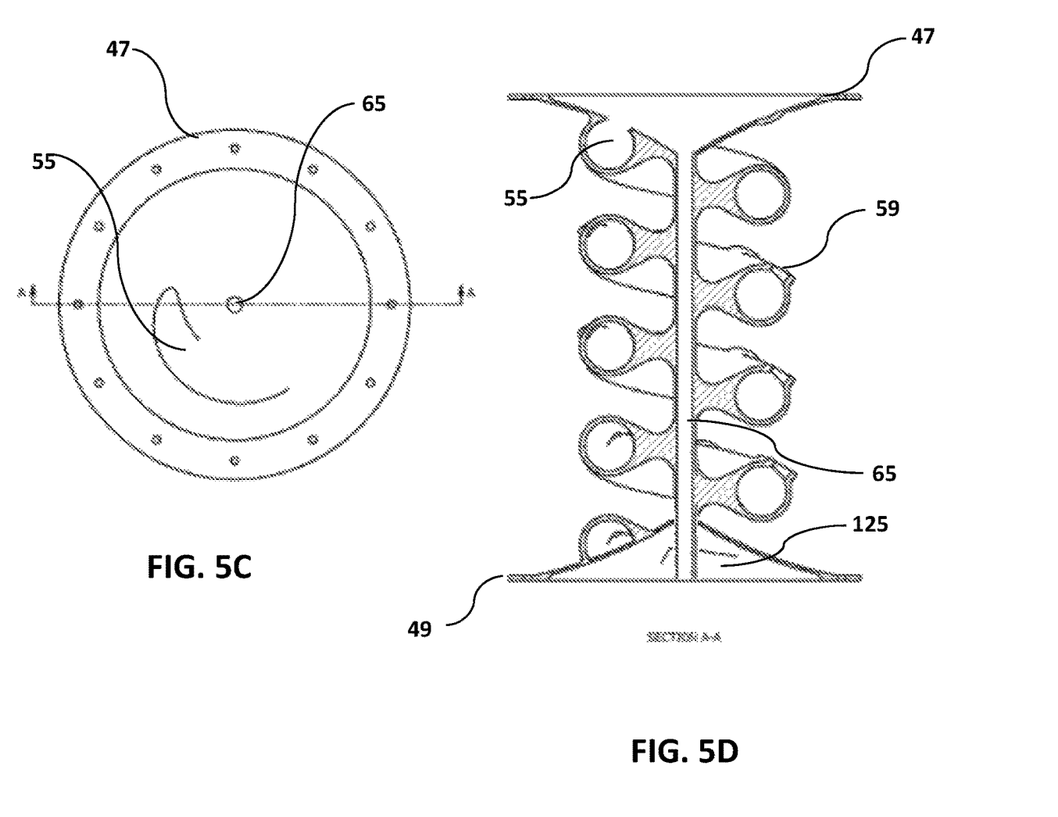
FIG. 5C is a top view of an exemplary embodiment of a planting column of the present invention having a helical configuration.
FIG. 5D is a sectional view of an exemplary of a planting column of the present invention having a helical configuration shown in 5D.

The planting column 5 can have a variety of configurations, such as a circular configuration shown in FIGS. 1-4, or a helical planting column 5 configuration illustrated in FIGS. 5A-DD. As shown in FIGS. 5A-5d, an exemplary embodiment of the present invention wherein the rotating planting column can be helical in shape. Similar to the cylindrical planting column, the helical planting column can have an interior cavity 55 that is primarily in a helical configuration. The interior cavity 55 can allow for the flow of an aqueous solution to flow through the cavity and interface with the pods 61. In some embodiment, the interior cavity can be configured in a vertical manner and use a misting function to contain the water within the interior cavity 55. In other exemplary embodiment, the interior cavity 55 can form a passageway for water to flow through using gravity. This rotational nutrient hydroponic helix can allow the plants to receive sufficient nutrient solution while reducing the likelihood of a potential clog occurring within the central conduit 65 that provides the aqueous solution. The water may be pumped up a central conduit to the top portion 47 of the column 5. The water then flows down the helical interior cavity 55 using gravity until the water flows back down through a drainage opening 125 proximate to the bottom portion of the column 5 and into a reservoir 63 at which point the solution can be pumped back up to the top portion 47 of the column 5. The interior cavity 55 is formed into a helical passageway allowing for water to constantly flow through the interior cavity 55 and provide nutrient rich solution to plants positioned in the opening 59. The recirculation process can be continued for pre-determined time period, manually, or based on machine learning from the control system 39 until adequate nutrients and water have been provided to the plants. The helical column 5 can be attached to flange blinds at the end to create a removable tower that still holds a watertight seal. Additionally, the helical shape may allow for a low pressure pump 93 to be used to distribute water through the helical column and can eliminate the need for high pressure pumps for misting that can potentially lead to clogging and reduced function. The helical column 5 also increases the efficiency and nearly eliminates any clogging issue that might occur in traditional hydroponic/aeroponic systems. Furthermore, the helical design can help maximize efficiency of the number of plants able to be used on a planting column using a nutrient film technique allowing more efficient use of space. Similarly, the planting columns can further be used outside of an enclosure and in open air environments. In one exemplary embodiment, the planting column can be affixed to a turbine powered by a power source, such as wind, internal combustion, or any other heat cycle.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A plant growing apparatus, comprising:
    an enclosure having an interior, wherein the interior of the enclosure is configured to maintain an interior environment within the enclosure and the enclosure is sized to be situated in an apartment or home;
    at least one light source;
    a planting column having a cavity formed therethrough;
    a drive motor coupled to a bottom portion of the planting column, wherein said drive motor is configured to rotate said planting column within the enclosure;
    a conduit having a dispensing apparatus at least partially positioned within the planting column, the dispensing apparatus configured to dispense an aqueous solution throughout the cavity, wherein said planting column is configured to be rotatably movable relative to the dispensing apparatus;
    a water source fluidly coupled to the conduit to selectively dispense the aqueous solution from the dispensing apparatus;
    at least one sensor;
    an irrigation system; and
    a control system configured to be communicatively coupled to the irrigation system, sensor, light source, and drive motor;

wherein, the at least one light source, planting column, drive motor, conduit, sensor, and irrigation system are self-contained with the enclosure as part of the plant growing apparatus.

2. The apparatus of claim 1, wherein the enclosure comprises a top, a base, and at least one wall, wherein said wall has an internal surface.

3. The apparatus of claim 2, wherein the internal surface of the wall configured to reflect light emitted within the enclosure.

4. The apparatus of claim 1, wherein the planting column further comprises a plurality of sections removably coupled to one another to form the cavity, each section having at least one opening configured to receive a plant.

5. The apparatus of claim 1, wherein the light source includes at least one light emitting diode (LED).

6. The apparatus of claim 5, wherein the LED provides a variable color spectrum that is selectable by the control system to manipulate plant growth.

7. The apparatus of claim 1, further wherein the water source includes a reservoir, wherein the reservoir is substantially separated from the interior of the enclosure by a bottom wall.

8. The apparatus of claim 1, wherein the water source, conduit, and irrigation system are fluidly coupleable to one another.

9. The apparatus of claim 1, wherein the dispensing apparatus is positioned through a top portion of the planting column.

10. The apparatus of claim 1, wherein the planting column rotates about the dispensing apparatus.

11. The apparatus of claim 1, wherein the irrigation system comprises a pump and a secondary fluid conduit configured to transport water from the water source to the conduit.

12. The apparatus of claim 1, wherein the enclosure is rectangular, having one or more openings to access the interior of the enclosure.

13. The apparatus of claim 1, further wherein the planting column further comprises a rotatable base.

14. The apparatus of claim 1, wherein the interior cavity of the planting column is arranged in a helical configuration.

15. The apparatus of claim 1, wherein the control system is configured to monitor and control temperature, humidity, and light color spectrum to manipulate plant growth within the enclosure.

16. The apparatus of claim 15, further comprising a drawer formed in the base of the plant growing apparatus to house a removable water reservoir.

17. A system of growing, monitoring, and purchasing plants for growing in a plant growing apparatus comprising:
providing a rotatable planting column formed of a plurality of sections removably coupled to one another to form a cavity;
assigning a plant pod having an individual species of plant an identifier;
classifying environmental variables that are associated with the identifier;
assigning a location code to the plant pod location within the plant growing apparatus, the location code being assigned to an opening of the rotatable planting column that provides access for at least a portion of the plant pod to the cavity;
implementing a control algorithm to determine optimal environmental conditions based on the environmental variables associated with the identifier and the location code;
averaging the environmental variables identified by the control system for a combination of plant species and locations within the system positioned in separate openings of the rotatable planting column; and
regulating the environment to achieve that preference one or more of the average environmental variable and the optimal environmental conditions;
wherein, regulating the environment includes distributing an aqueous solution with a dispensing apparatus throughout the cavity of the rotatable planting column.

18. An apparatus for growing plants, comprising:
a water source;
a growing column having an interior cavity and at least one opening configured to allow access to said interior cavity;
an enclosure surrounding the growing column and sized to be situated in an apartment or home;
a pump fluidly connected to the water source; and
a single dispensing apparatus positioned through a top portion of the growing column and fluidly coupled to the pump to dispense an aqueous solution throughout the entire interior cavity wherein unused aqueous solution is directed through the cavity to a reservoir through gravity;
wherein, said pump is configured to provide water from the water source to the interior cavity through the single dispensing apparatus;
further wherein, the single dispensing apparatus is rotationally coupled to the top portion of the growing column to allow the growing column to rotate relative to the dispensing apparatus;
further wherein, the growing column, enclosure, pump, and single dispensing apparatus are self-contained or configured to be integrated into a kitchen as an appliance.

19. The apparatus of claim 18, further comprising a plant growing pod comprising a top rim and a bottom portion configured to fit within said opening, wherein said bottom portion is configured to extend at least partially into said interior cavity of the growing column.

20. The apparatus of claim 1, wherein the at least one light source is positioned at least partially along a corner of the interior of the enclosure.

* * * * *